US011059957B2

(12) United States Patent
Cigada et al.

(10) Patent No.: US 11,059,957 B2
(45) Date of Patent: Jul. 13, 2021

(54) HIGHLY ENVIRONMENTALLY SUSTAINABLE COMPOSITE MATERIAL

(71) Applicants: NEXTMATERIALS S.R.L., Milan (IT); POLITECNICO DI MILANO, Milan (IT)

(72) Inventors: Alberto Cigada, Milan (IT); Mauro Profaizer, Ardenno (IT); Barbara Del Curto, Milan (IT); Maria Cristina Tanzi, Milan (IT); Silvia Faré, Milan (IT); Nadia Barelli, Bernareggio (IT)

(73) Assignee: NEXTMATERIALS S.R.L, Milan (IT)

( * ) Notice: Subject to any disclaimer, the term of this patent is extended or adjusted under 35 U.S.C. 154(b) by 349 days.

(21) Appl. No.: 15/739,322

(22) PCT Filed: Jun. 24, 2016

(86) PCT No.: PCT/IB2016/053777
§ 371 (c)(1),
(2) Date: Dec. 22, 2017

(87) PCT Pub. No.: WO2016/207849
PCT Pub. Date: Dec. 29, 2016

(65) Prior Publication Data
US 2020/0040163 A1 Feb. 6, 2020

(30) Foreign Application Priority Data
Jun. 26, 2015 (IT) .................. 102015000028276

(51) Int. Cl.
| C08L 1/02 | (2006.01) |
| B33Y 40/00 | (2020.01) |
| B33Y 70/00 | (2020.01) |
| B29C 64/314 | (2017.01) |
| C08L 29/02 | (2006.01) |
| C08L 29/04 | (2006.01) |
| C08L 3/02 | (2006.01) |
| C08L 97/02 | (2006.01) |
| B33Y 80/00 | (2015.01) |
| B29K 101/12 | (2006.01) |
| B29K 401/00 | (2006.01) |

(52) U.S. Cl.
CPC .............. *C08L 1/02* (2013.01); *B29C 64/314* (2017.08); *B33Y 40/00* (2014.12); *B33Y 70/00* (2014.12); *C08L 3/02* (2013.01); *C08L 29/02* (2013.01); *C08L 29/04* (2013.01); *C08L 97/02* (2013.01); *B29K 2101/12* (2013.01); *B29K 2401/00* (2013.01); *B33Y 80/00* (2014.12); *C08L 2205/03* (2013.01)

(58) Field of Classification Search
CPC ........ C08L 1/02; C08L 29/02; C08L 2205/03; C08L 3/02; C08L 29/04; C08L 97/02; B33Y 40/00; B33Y 70/00; B33Y 80/00; B29C 64/314; B29K 2101/12; B29K 2401/00
See application file for complete search history.

(56) References Cited

FOREIGN PATENT DOCUMENTS

| JP | 09-296087 | * 11/1997 |
| WO | 2008078961 A1 | 7/2008 |

OTHER PUBLICATIONS

Machine English translation of JP 09-296087, Watanabe et al., Nov. 1997.*
Zhang et al., "Mechanochemical activation of cellulose and its theromplastic polyvinyl alcohol ecocomposites with enhanced physiochemical properties", Carbohydrate Polymers, Applied Science Publishers LTD., Barking GB, vol. 83, No. 1, pp. 257-263, Jan. 1, 2011.
Kaushik et al., "Green nanocomposites based on thermoplastic starch and steam exploded cellulose nanofibrils from wheat straw", Carbohydrate Polymers, Applied Science Publishers LTD., Barking GB, vol. 82, No. 2, pp. 337-345, Sep. 5, 2010.
International Search Report and Written Opinion in PCT/IB2016/053777 dated Sep. 21, 2016.

* cited by examiner

*Primary Examiner* — Patrick D Niland
(74) *Attorney, Agent, or Firm* — Manelli Selter PLLC; Edward Stemberger

(57) ABSTRACT

The present invention related to a thermoplastic composition, suitable to be submitted to common methods of heat forming, or thermoforming, of thermoplastic materials, as well as the thermoformed composite material which is obtained/can be obtained from said thermoplastic composition, said thermoplastic composition and said thermoformed composite material derived therefrom comprising the combination of cellulose with a thermoplastic material comprising a hydrolysable or hydrosoluble polyhydroxylated polymer, such as starch or a polymer based on polyvinyl alcohol (PVA), wherein cellulose is available in an amount ranging from 30 to 60% by Weight, preferably from 40 to 60% by weight, said percentages being calculated on 100 parts by weight of the combination of cellulose with the thermoplastic material comprising a hydrolysable or hydrosoluble polyhydroxylated polymer.

15 Claims, 2 Drawing Sheets

US 11,059,957 B2

HIGHLY ENVIRONMENTALLY SUSTAINABLE COMPOSITE MATERIAL

TECHNICAL FIELD OF THE INVENTION

The invention relates to a thermoplastic composition, suitable to be submitted to common methods of heat forming, or thermoforming, of thermoplastic materials, as well as the thermoformed composite material which is obtained/can be obtained from said thermoplastic composition and the relevant process of preparation, said thermoplastic composition and said thermoformed composite material derived therefrom comprising the combination of cellulose with a thermoplastic material comprising a hydrolysable or hydrosoluble polyhydroxylated polymer, preferably starch or a polymer based on polyvinyl alcohol, wherein in said thermoplastic composition and composite material a further component is optionally available, which is an organic or inorganic additive, such as borax or ketone-aldehyde resins, in order to modulate the water degradability and moisture sensitivity of the thermoplastic composition or of the composite material obtained therefrom. Said thermoplastic composition and the relevant composite material obtained therefrom, both covered by the present invention, are characterised by rheological properties and hot-workability, as well as by the possibility to implement intermediate products or finished manufactured articles with good mechanical properties, particularly elasticity), accompanied by improved compatibility and high environmental sustainability compared to what can be achieved in machining processes of thermoforming in general of the thermoplastic materials conventionally in use, in particular characterised by recyclability in the processing chain of paper and cardboard.

The present invention also relates to the process of thermoforming transformation of the thermoplastic composition as described herein into the relevant thermoformed composite material as well as to the use of said composite material in the following thermoforming processes, including 3D printing, for the preparation of intermediate products or finished manufactured articles including said composite material.

STATE OF THE ART

In the field of thermoforming of plastic materials, the polymer and composite materials currently used, in particular those used for 3D printing and those used for stiff food receptacles (for example polystyrene foam) or for packaging in general, are not characterised by high environmental sustainability.

Materials based on starch, compostable but not recyclable, which also determinate the risk of taking away fertile soil from agriculture for their production, are widely spreading.

In order to overcome these problems, hydrosoluble materials, such as PVA (polyvinyl alcohol) or thermoplastic materials containing polyvinyl alcohol, which are soluble in water but are not recyclable, are becoming established.

In particular, in 3D printing ABS (acrylonitrile-butadiene-styrene) resins and Nylon, which show the same problems of separate waste collection and recycling as all non-biodegradable polymer materials, and PLA (polylactic acid), obtained from starch, compostable but not recyclable, are substantially used.

In consideration of the foregoing, there was the strong need to implement new thermoplastic compositions and relevant composite materials, having such rheological properties and hot-workability as to allow intermediate products or finished manufactured articles to be implemented with good mechanical properties accompanied by improved compatibility and high environmental sustainability compared to what can be achieved in machining processes of thermoforming in general of the thermoplastic materials conventionally in use, in particular characterised by recyclability in the processing chain of paper and cardboard:

SUMMARY OF THE INVENTION

Continuing research in the present technical field, the applicants surprisingly and unexpectedly implemented a thermoplastic composition, suitable to be submitted to common methods of heat forming, or thermoforming, of thermoplastic materials, as well as the thermoformed composite material which is obtained/can be obtained from said thermoplastic composition, said thermoplastic composition and said thermoformed composite material derived therefrom comprising the combination of cellulose with a thermoplastic material comprising a hydrolysable or hydrosoluble polyhydroxylated polymer, such as starch or a polymer based on polyvinyl alcohol (PVA), wherein cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the combination of cellulose with the thermoplastic material comprising a hydrolysable or hydrosoluble polyhydroxylated polymer.

As to the thermoplastic composition according to the present invention and the thermoplastic material comprising a hydrolysable or hydrosoluble polyhydroxylated polymer, such as starch or a polymer based on polyvinyl alcohol, they are available as particles, preferably as substantially anhydrous mixture.

On account of a high percentage of cellulose inside a hydrosoluble matrix, the material is suitable for recyclability in the processing chain of paper and cardboard.

Both cellulose particles and particles of the thermoplastic material comprising a hydrolysable or hydrosoluble polyhydroxylated polymer, such as starch or a polymer based on polyvinyl alcohol, can be in the form of granules, spherules or fibres, having a size comprised from tenths of millimetres to micrometres, preferably having a micrometric size, preferably having an average size not exceeding 70 micrometres, even more preferably having an average size not exceeding 50 micrometres, both as powders and as granulates.

Preferably cellulose is in the form of cellulose fibres, preferably having a micrometric size, even more preferably cellulose is in the form of fibres having an average size not exceeding 70 micrometres, preferably not exceeding 50 micrometres.

In said thermoplastic composition and thermoformed composite material derived therefrom, both covered by the present invention, a further component is optionally available, which is an organic or inorganic additive, such as borax or ketone-aldehyde resins, in order to modulate the water degradability and moisture sensitivity of the thermoplastic composition or of the thermoformed composite material obtained therefrom, wherein the additive is available in an amount equal to or less than 10% by weight, preferably not exceeding 3.5% by weight, cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose, thermoplastic material and additive.

In the case of the thermoplastic composition according to the present invention, the organic or inorganic additive, such as borax or ketone-aldehyde resins, in order to modulate the water degradability and moisture sensitivity of the thermoplastic composition, when available, is added in the form of solution to the substantially anhydrous mixture of the cellulose particles and the particles of thermoplastic material, so that the solution containing said additive is absorbed by cellulose and, after the components have been mixed, redistributed in the thermoplastic composition.

A further object of the present invention is the thermoplastic composition as described above in the form of dry-blend, granules, spherules or fibres, having a size comprised from tenths of millimetres to micrometres, preferably having a micrometric size, preferably having an average size not exceeding 70 micrometres, even more preferably having an average size not exceeding 50 micrometres, both as powders and as granulates.

A further object of the present invention is the thermoformed composite material which is obtained/can be obtained from the thermoplastic composition as described above, by submitting said thermoplastic composition to the common methods of heat forming, or thermoforming, of thermoplastic materials, such as: extrusion, injection, drawing, compression and vacuum moulding or rotational moulding or blow moulding, 3D printing; a further object of the present invention is the relevant process of preparation of the thermoformed composite material starting from the thermoplastic composition as described above.

A further object of the present invention is a manufactured article such as receptacles, tubs for foodstuff, display units, packagings of any kind, objects of any kind achieved by extrusion, injection, drawing, compression and vacuum moulding or rotational moulding or blow moulding or 3D printing or a semifinished product such as pellets, granules, powders, threads/yarns, filaments for use in 3D printing, reinforcement profiles, comprising the thermoformed composite material as described above.

A further object of the present invention is a manufactured article such as receptacles, tubs for foodstuff, display units, packagings of any kind, objects of any kind or a semifinished product such as pellets, granules, powders, threads/yarns, filaments for use in 3D printing, reinforcement profiles, obtained by submitting to the common methods of heat forming, or thermoforming, of thermoplastic materials, such as: extrusion, injection, drawing, compression and vacuum moulding or rotational moulding or blow moulding, 3D printing, the thermoplastic composition or the thermoformed composite material derived therefrom as described above, both objects of the present invention. A further object of the present invention is a production process of a manufactured article, such as receptacles, tubs for foodstuff, display units, packagings of any kind, objects of any kind or a semifinished product such as pellets, granules, powders, threads/yarns, filaments for use in 3D printing, reinforcement profiles, wherein the thermoplastic composition or the thermoformed composite material derived therefrom as described above, both objects of the present invention, is submitted to the common methods of heat forming, or thermoforming, of thermoplastic materials; such as: extrusion, injection, drawing, compression and vacuum moulding or rotational moulding or blow moulding, 3D printing.

Further objects of the present invention are the use of the thermoplastic composition comprising a polymer based on polyvinyl alcohol or the use of the thermoformed composite material comprising a polymer based on polyvinyl alcohol as described according to the present invention in 3D printing or injection or injection moulding.

A further object of the present invention is a manufactured article, such as receptacles, tubs for foodstuff, display units, packagings of any kind, objects of any kind or a semifinished product obtained by 3D printing or by injection or by injection moulding, wherein the thermoplastic composition comprising a polymer based on polyvinyl alcohol or the thermoformed composite material comprising a polymer based on polyvinyl alcohol as described according to the present invention are used.

A further object of the present invention is the use of the thermoplastic composition comprising starch as described according to the present invention for producing thermoformed packaging.

A further object of the present invention is a process for producing packaging wherein the thermoplastic composition comprising starch as described according to the present invention is submitted to thermoforming.

A further object of the present invention is a thermoformed packaging comprising the thermoformed composite material comprising starch as described according to the present invention.

DETAILED DESCRIPTION OF THE INVENTION

Figure 1:
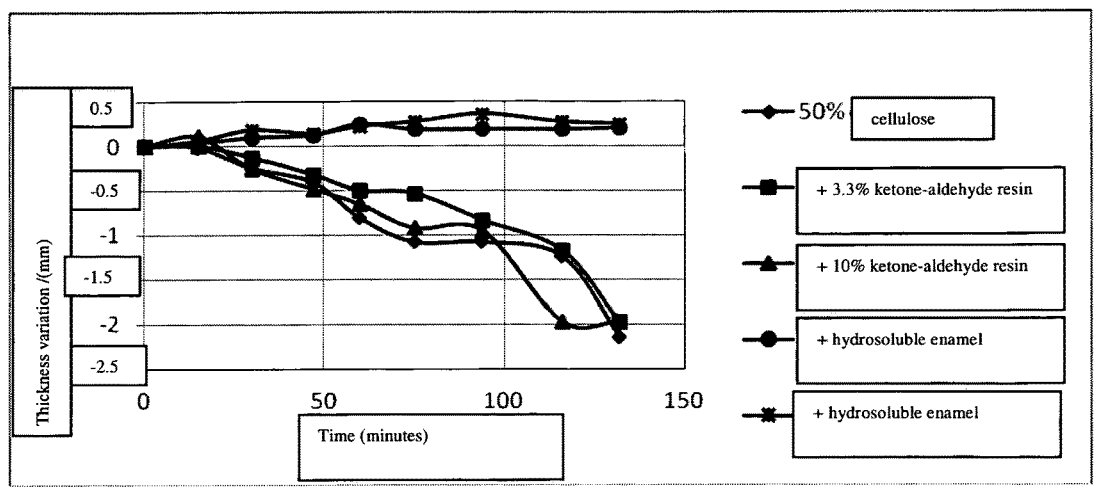
FIG. 1. A graph is shown representing the progress of dissolution in water: thickness variation as a function of the immersion time, at room/ambient temperature (20-25° C.), of specimens implemented with the thermoformed composite material according to the present invention.

In accordance with the foregoing, an object of the present invention is:

a thermoplastic composition, suitable to be submitted to common methods of heat forming, or thermoforming, of thermoplastic materials, containing a substantially anhydrous mixture comprising: cellulose particles, preferably cellulose fibre, even more preferably cellulose or cellulose fibre obtained from recycled paper or recycled cardboard, in combination with particles of a thermoplastic material comprising a hydrolysable or hydrosoluble polyhydroxylated polymer, such as starch or a polymer based on polyvinyl alcohol, wherein cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the combination of cellulose with the thermoplastic material comprising a hydrolysable or hydrosoluble polyhydroxylated polymer.

Preferably the thermoplastic material comprising a hydrolysable or hydrosoluble polyhydroxylated polymer can be selected from: a thermoplastic material comprising starch, a thermoplastic material comprising a polymer based on polyvinyl alcohol (PVA), starch or a polymer based on polyvinyl alcohol (PVA).

Both cellulose particles and particles of the thermoplastic material comprising a hydrolysable or hydrosoluble polyhydroxylated polymer, such as starch or a polymer based on polyvinyl alcohol, can be in the form of granules, spherules or fibres, having a size comprised from tenths of millimetres to micrometres, preferably having a micrometric size, preferably having an average size not exceeding 70 micrometres, even more preferably having an average size not exceeding 50 micrometres, both as powders and as granulates Preferably cellulose is in the form of cellulose fibres, preferably having a micrometric size, even more preferably cellulose is in the form of fibres having an average size not exceeding 70 micrometres, preferably not exceeding 50 micrometres.

The thermoplastic composition according to the present invention optionally contains, in addition to the substantially anhydrous mixture, a component which is an organic or inorganic additive, such as borax or ketone-aldehyde resins, in order to modulate the water degradability and moisture sensitivity of the thermoplastic composition or of the thermoformed composite material obtained therefrom, wherein the additive is available in an amount equal to or less than 10% by weight, preferably not exceeding 3.5% by weight, cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose, thermoplastic material and additive.

A particularly preferred further form of embodiment of the thermoplastic composition according to the present invention is a thermoplastic composition, suitable to be submitted to common methods of heat forming, or thermoforming, of thermoplastic materials, containing a substantially anhydrous mixture comprising cellulose particles in combination with particles of a thermoplastic material comprising a polymer based on polyvinyl alcohol, wherein cellulose fibres are available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentage being calculated on 100 parts by weight of the combination of cellulose fibres with the thermoplastic material comprising a polymer based on polyvinyl alcohol, optionally comprising a further component, ketone-aldehyde resins, as additive in order to modulate the water degradability and moisture sensitivity of the thermoplastic composition, wherein the additive is available in an amount equal to or less than 10% by weight, preferably not exceeding 3.5% by weight, cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose fibres, thermoplastic material comprising a polymer based on polyvinyl alcohol and ketone-aldehyde resins.

A further object of the present invention is the thermoplastic composition as described above in the form of dry-blend, granules, spherules or fibres, having a size comprised from tenths of millimetres to micrometres, preferably having a micrometric size, preferably having an average size not exceeding 70 micrometres, even more preferably having an average size not exceeding 50 micrometres, both as powders and as granulates.

A further object of the present invention is a thermoplastic composition, suitable to be submitted to common methods of heat forming, or thermoforming, of thermoplastic materials, containing:
  cellulose particles, preferably cellulose fibre, even more preferably cellulose or cellulose fibre obtained from recycled paper or recycled cardboard, in combination with
  particles of a thermoplastic material comprising a hydrolysable or hydrosoluble polyhydroxylated polymer, such as starch or a polymer based on polyvinyl alcohol,
  wherein cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-0.60% by weight, in particular the amount of 30% or 50% by weight, said percentages being calculated on 100 parts by weight of the combination of cellulose with the thermoplastic material comprising a hydrolysable or hydrosoluble polyhydroxylated polymer, optionally comprising a further component, which is an organic or inorganic additive, such as borax or ketone-aldehyde resins, in order to modulate the water degradability and moisture sensitivity of the thermoplastic composition, wherein the additive is available in an amount equal to or less than 10% by weight, preferably not exceeding 3.5% by weight, cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose, thermoplastic material and additive.

A further object of the present invention is a thermoplastic composition, suitable to be submitted to common methods of heat forming, or thermoforming, of thermoplastic materials, containing:

cellulose fibres, in combination with particles of a thermoplastic material comprising a polymer based on polyvinyl alcohol, wherein cellulose fibres are available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentage being calculated on 100 parts by weight of the combination of cellulose fibres with the thermoplastic material comprising a polymer based on polyvinyl alcohol, optionally comprising a further component, ketone-aldehyde resins, as additive in order to modulate the water degradability and moisture sensitivity of the thermoplastic composition, wherein the additive is available in an amount equal to or less than 10% by weight, preferably not exceeding 3.5% by weight, cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose fibres, thermoplastic material comprising a polymer based on polyvinyl alcohol and ketone-aldehyde resins.

A further object of the present invention is a thermoformed composite material comprising: cellulose, preferably cellulose fibre, even more preferably cellulose or cellulose fibre obtained from recycled paper or recycled cardboard, in combination with a thermoplastic material comprising a hydrolysable or hydrosoluble polyhydroxylated polymer, such as starch or a polymer based on polyvinyl alcohol, wherein cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the combination of cellulose with the thermoplastic material comprising a hydrolysable or hydrosoluble polyhydroxylated polymer, optionally comprising a further component, which is an organic or inorganic additive, such as borax or ketone-aldehyde resins, in order to modulate the water degradability and moisture sensitivity of the thermoplastic composition, wherein the additive is available in an amount equal to or less than 10% by weight, preferably not exceeding 3.5% by weight, cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose, thermoplastic material and additive.

In a particularly preferred form of embodiment of the thermoformed composite material which is the object of the present invention, when cellulose is in the form of cellulose fibre, it has a micrometric size, more preferably cellulose fibres have an average size not exceeding 70 micrometres, even more preferably not exceeding 50 micrometres.

In a further preferred form of embodiment of the thermoformed composite material according to the present invention, said thermoformed composite material comprising:

cellulose fibres, in combination with particles of a thermoplastic material comprising a polymer based on polyvinyl alcohol, wherein cellulose fibres are available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentage being calculated on 100 parts by weight of the combination of cellulose fibres with the thermoplastic material comprising a polymer based on polyvinyl alcohol, optionally comprising a further component, ketone-aldehyde resins, as additive in order to modulate the water degradability and moisture sensitivity of the thermoplastic composition, wherein the additive is available in an amount equal to or less than 10% by weight, preferably not exceeding 3.5% by weight, cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose fibres, thermoplastic material comprising a polymer based on polyvinyl alcohol and ketone-aldehyde resins.

A further object of the present invention is a manufactured article such as receptacles, tubs for foodstuff, display units, packagings of any kind, objects of any kind or a semifinished product such as pellets, granules, powders, threads/yarns, filaments for use in 3D printing, reinforcement profiles, comprising the thermoformed composite material as described above and object of the present invention.

A further object of the present invention is a composite material which is obtained/can be obtained by thermoforming of, or by submitting to the common methods of heat forming, or thermoforming, such as: extrusion, injection, drawing, compression and vacuum moulding or rotational moulding or blow moulding, 3D printing, a thermoplastic composition containing a substantially anhydrous mixture comprising cellulose particles, preferably cellulose fibre, even more preferably cellulose or cellulose fibre obtained from recycled paper or recycled cardboard, in combination with particles of a thermoplastic material comprising a hydrolysable or hydrosoluble polyhydroxylated polymer, such as starch or a polymer based on polyvinyl alcohol, wherein cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the combination of cellulose with the thermoplastic material comprising a hydrolysable or hydrosoluble polyhydroxylated polymer, optionally comprising a further component, which is an organic or inorganic additive, such as borax or ketone-aldehyde resins, in order to modulate the water degradability and moisture sensitivity of the thermoplastic composition or of the thermoformed composite material derived therefrom, wherein the additive is available in an amount equal to or less than 10% by weight, preferably not exceeding 3.5% by weight, cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose, thermoplastic material and additive.

A particularly preferred further form of embodiment of the composite material which is obtained/can be obtained according to the present invention is a composite material which is obtained/can be obtained by thermoforming of, or by submitting to the common methods of heat forming, or thermoforming, such as: extrusion, injection, drawing, compression and vacuum moulding or rotational moulding or blow moulding, 3D printing, a thermoplastic composition containing a substantially anhydrous mixture comprising cellulose fibres, in combination with particles of a thermoplastic material comprising a polymer based on polyvinyl alcohol, wherein cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the combination of cellulose with the thermoplastic material comprising a polymer based on polyvinyl alcohol, optionally comprising a further component, ketone-aldehyde resins, as additive in order to modulate the water degradability and moisture sensitivity of the thermoplastic composition, wherein the additive is available in an amount equal to or less than 10% by weight, preferably not exceeding 3.5% by weight, cellulose is available in an amount ranging from 30 to 60% by weight, preferably from 40 to 60% by weight, such as in the amount of 30%, 35%, 40%, 45%, 50%, 55% or 60% by weight, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose fibres, thermoplastic material comprising a polymer based on polyvinyl alcohol and ketone-aldehyde resins.

A further object of the present invention is a composite material which is obtained/can be obtained by thermoforming of, or by submitting to the common methods of heat forming, or thermoforming, such as: extrusion, injection, drawing, compression and vacuum moulding or rotational moulding or blow moulding, 3D printing, a thermoplastic composition containing:
  cellulose particles, preferably cellulose fibre, even more preferably cellulose or cellulose fibre obtained from recycled paper or recycled cardboard, in combination with
  particles of a thermoplastic material comprising a hydrolysable or hydrosoluble polyhydroxylated polymer, such as starch or a polymer based on polyvinyl alcohol, wherein cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the combination of cellulose with the thermoplastic material comprising a hydrolysable or hydrosoluble polyhydroxylated polymer, optionally comprising a further component, which is an organic or inorganic additive, such as borax or ketone-aldehyde resins, in order to modulate the water degradability and moisture sensitivity of the thermoplastic composition, wherein the additive is available in an amount equal to or less than 10% by weight, preferably not exceeding 3.5% by weight, cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose, thermoplastic material and additive.

A further object of the present invention is a composite material which is obtained/can be obtained by thermoforming of, or by submitting to the common methods of heat forming, or thermoforming, such as: extrusion, injection, drawing, compression and vacuum moulding or rotational moulding or blow moulding, 3D printing, a thermoplastic composition containing:

cellulose fibres, in combination with particles of a thermoplastic material comprising a polymer based on polyvinyl alcohol, wherein cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the combination of cellulose fibres with the thermoplastic material comprising a polymer based on polyvinyl alcohol, optionally comprising a further component, ketone-aldehyde resins, as additive in order to modulate the water degradability and moisture sensitivity of the thermoplastic composition, wherein the additive is available in an amount equal to or less than 10% by weight, preferably not exceeding 3.5% by weight, wherein cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose fibres, thermoplastic material comprising a polymer based on polyvinyl alcohol and ketone-aldehyde resins.

A further object of the present invention is a thermoplastic composition, suitable to be submitted to the common methods of heat forming, or thermoforming, of thermoplastic materials, such as: extrusion, injection, drawing, compression and vacuum moulding or rotational moulding or blow moulding, 3D printing, as well as the thermoformed composite material which is obtained/can be obtained from said thermoplastic composition as described above, by submitting said thermoplastic composition to the common methods of heat forming, or thermoforming, of thermoplastic materials, such as: extrusion, injection, drawing, compression and vacuum moulding or rotational moulding or blow moulding, 3D printing, said thermoplastic composition and said thermoformed composite material derived therefrom comprising the combination of cellulose with a thermoplastic material comprising a hydrolysable or hydrosoluble polyhydroxylated polymer, such as starch or a polymer based on polyvinyl alcohol (PVA), wherein cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the combination of cellulose with the thermoplastic material comprising a hydrolysable or hydrosoluble polyhydroxylated polymer, said thermoplastic composition and said thermoformed composite material derived therefrom also optionally comprising a component which is an organic or inorganic additive, such as borax or ketone-aldehyde resins, in order to modulate the water degradability and moisture sensitivity of the thermoplastic composition and of the thermoformed composite material derived therefrom, wherein the additive is available in an amount equal to or less than 10% by weight, preferably not exceeding 3.5% by weight, cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose, thermoplastic material and additive.

In a further form of embodiment of the thermoplastic compositions or of the thermoformed composite material which is the object of the present invention, regardless of the nature of the thermoplastic material comprising a hydrolysable or hydrosoluble polyhydroxylated polymer, such as starch or a polymer based on polyvinyl alcohol (PVA), and of the organic or inorganic additive, if any, such as borax or ketone-aldehyde resins, in order to modulate the water degradability and moisture sensitivity of the thermoplastic composition or of the thermoformed composite material, cellulose, preferably in the form of fibres, is available in an amount ranging from 30 to 40% by Weight, in particular in an amount of 30% by weight, said percentages being calculated on 100 parts by weight of the sum of the cellulose with the thermoplastic material or on 100 parts by weight of the sum of cellulose, thermoplastic material and additive, in particular when the thermoplastic composition has been submitted to or the material derived therefrom is obtained through 3D printing, a thermoforming process wherein too high percentages of cellulose, such as 40 to 50% or up to 60%, entail a higher risk of obstruction of the nozzles of the 3D printer itself, therefore higher difficulty, although not impossibility, to perform 3D printing. These difficulties are not to be found for thermoplastic compositions or thermoformed composite material according to the present invention, wherein: cellulose, preferably in fibres, is available in an amount ranging indifferently from 30 to 60% by weight, from 40 to 60% by weight or from 30 to 40% by weight, from 40 to 50% by weight, said percentages being calculated on 100 parts by weight of the sum of cellulose with the thermoplastic material or on 100 parts by weight of the sum of cellulose, thermoplastic material and additive, when said thermoplastic compositions or said thermoformed composite material are involved in the common methods of heat forming, or thermoforming, of thermoplastic materials, such as: extrusion, injection, drawing, compression and vacuum moulding or rotational moulding or blow moulding.

A further object of the present invention is a thermoformed composite material comprising:
cellulose, preferably in fibres, in combination with starch,
wherein cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the combination of cellulose with starch,
optionally comprising a further component, which is an organic or inorganic additive, such as borax or ketone-aldehyde resins, in order to modulate the water degradability and moisture sensitivity of the thermoformed composite material, wherein the additive is available in an amount equal to or less than 10% by weight, preferably not exceeding 3.5% by weight, cellulose is available in an amount ranging from 30 to 60% by weight, preferably from 40 to 60% by weight, such as in the amount of 30%, 35%, 40%, 45%, 50%, 55% or 60% by weight, and corresponding ranges including said amounts as endpoints, such as the following ranges of % by weight: 30-35%, 35-40%, 40-45%, 45-50%, 50-55%, 55-60%, 30-40%, 30-45%, 30-50%, 30-55%, 35-45%, 35-50%, 35-55%, 35-60%, 40-50%, 40-55%, 45-55%, 45-60% or 50-60% by weight, in particular the amount of 30% or 50% by weight, said percentages being calculated on 100 parts by weight of the sum of the three components: cellulose, starch and additive.

A further object of the present invention is the use of the thermoplastic composition or of the thermoformed composite material obtained from said composition, as described herein, said thermoplastic composition or thermoformed composite material comprising:
the combination of starch and cellulose, preferably in fibres, optionally in the presence of an organic or inorganic additive in order to modulate the water degradability and moisture sensitivity, or
comprising the combination of a thermoplastic material comprising a polymer based on polyvinyl alcohol and cellulose, preferably in fibres, optionally in the presence of an organic or inorganic additive in order to modulate the water degradability and moisture sensitivity, in the common methods of heat forming, or thermoforming, of thermoplastic materials, such as: extrusion, injection, drawing, compression and vacuum moulding or rotational moulding or blow moulding, 3D printing, in particular injection moulding or 3D printing.

A further object of the present invention is a manufactured article such as receptacles, tubs for foodstuff, display units, packagings of any kind, objects or a semifinished product such as pellets, granules, powders, threads/yarns, filaments for use in 3D printing, reinforcement profiles, obtained by submitting to the common methods of heat forming, or thermoforming, of thermoplastic materials, such as: extrusion, injection, drawing, compression and vacuum moulding or rotational moulding or blow moulding, 3D printing, the thermoplastic composition or the thermoformed composite material derived therefrom as described above, both objects of the present invention.

A further object of the present invention is a production process of a manufactured article, such as receptacles, tubs for foodstuff, display units, packagings of any kind, objects or a semifinished product such as pellets, granules, powders, threads/yarns, filaments for use in 3D printing, reinforcement profiles, wherein the thermoplastic composition or the thermoformed composite material derived therefrom as described above, both objects of the present invention, is submitted to the common methods of heat forming, or thermoforming, of thermoplastic materials, such as: extrusion, injection, drawing, compression and vacuum moulding or rotational moulding or blow moulding, 3D printing.

Further objects of the present invention are the use of the thermoplastic composition comprising a polymer based on polyvinyl alcohol or the use of the thermoformed composite material comprising a polymer based on polyvinyl alcohol as described according to the present invention in 3D printing or injection or injection moulding.

A further object of the present invention is a manufactured article, such as receptacles, tubs for foodstuff, display units, packagings of any kind, objects or a semifinished product obtained by 3D printing or by injection or by injection moulding, wherein the thermoplastic composition comprising a polymer based on polyvinyl alcohol or the thermoformed composite material comprising a polymer based on polyvinyl alcohol as described according to the present invention are used.

A further object of the present invention is the use of the thermoplastic composition comprising starch as described according to the present invention for producing thermoformed packaging.

A further object of the present invention is a process for producing packaging wherein the thermoplastic composition comprising starch as described according to the present invention is submitted to thermoforming.

A further object of the present invention is a thermoformed packaging comprising the thermoformed composite material comprising starch as described according to the present invention.

Thermoplastic material comprising a hydrosoluble polymer based on polyvinyl alcohol according to the present invention is to be understood as a plastic material which is well known in the state of the art, easily retrievable on the market, such as for example the polyvinyl alcohol PVA marketed as HYDROLENE®, whose various available forms have long been described in patent literature, such as for example the thermoplastic material comprising a hydrosoluble polymer based on polyvinyl alcohol as described in Italian patent No. 1 140 254 and in the corresponding European patent EP 122 337, wherein polyvinyl alcohol, in combination with one or more polyhydroxylated monomer alcohols, preferably selected from those having at least three primary alcohol functional groups per mole, shows the main melting peak, determined through DTA (differential thermal analysis), ranging from 160° C. to 230° C., and preferably polyvinyl alcohol has a hydrolysis of more than 70%, expressed as molar fraction, and a polymerisation degree ranging from 500 to 2,500.

A further example of thermoplastic material according to the present invention is the thermoplastic material comprising hydrosoluble polymers based on polyvinyl alcohol as described in Italian patent No. 1 275 860 wherein, starting from the material described in Italian patent No. 1 140 254, said material is characterised by a polyvinyl alcohol with a polymerisation degree of more than 500 and a hydrolysis degree of at least 70 and containing at most 20% by weight, compared to the polyvinyl alcohol, of one or more low-freezing liquid aliphatic polyoxydrilic alcohols.

A further example of thermoplastic material according to the present invention is the thermoplastic material comprising hydrosoluble polymers based on polyvinyl alcohol as described in patent application WO 2013/069037, where the thermoplastic material comprises a poly (vinyl alcohol) having a medium-low molecular weight, preferably a molecular weight ranging from 12,000 to 200,000 Da and more preferably from 15,000 to 140,000 Da, with dynamic viscosity in 4% aqueous solution of less than 10 mPaS (as measured by a Brookfield viscosimeter) at a temperature of 20° C. (DIN 53015), and is characterised by a hydrolysis degree, preferably from 70 to 99% and more preferably from 75 to 90% (even more preferably from 80 to 88%).

Starch according to the present invention is to be understood as both the starch of food origin such as maize, potato, rice, tapioca, wheat or legume starch and any other type of starch to be found on the market, generally consisting to an extent of about 20-30% of amylose and to an extent of about 70-80% of amylopectin.

It can be understood also as a starch consisting of a percentage of amylose of more than 90% characterised by better extrudability and higher dimensional stability than traditional starch.

Cellulose according to the present invention is to be understood as a polysaccharide whose long linear chains are formed only by β-D-glucose units interconnected by β(1→4) glycosidic linkages. The average molecular mass is about 500,000 u, but there are chains with molecular mass exceeding even two millions.

The term "thermoforming" or "heat forming", which are equivalent to each other, according to the present invention are to be understood as all the known methods of forming of thermoplastic materials such as extrusion, injection, drawing, compression and vacuum moulding or rotational moulding or blow moulding, 3D printing.

The terms "thermoformed" or "heat formed", which are equivalent to each other, according to the present invention are to be understood as a thermoplastic composite material obtained by submitting the thermoplastic composition according to the present invention to the known methods of forming of thermoplastic materials such as extrusion, injection, drawing, compression and vacuum moulding or rotational moulding or blow moulding, 3D printing.

The thermoplastic composition according to the present invention is prepared by mixing with each other, with the ordinary mixing methods, preferably mechanical methods, but also through inert gases under pressure, the cellulose and the thermoplastic material comprising a hydrolysable or hydrosoluble polyhydroxylated polymer, as particles in the form of powders or particulate, having the desired size, shape and granulometry.

When available, the additive is added in the form of solution to the mixture of cellulose and thermoplastic material, so that the solution containing said additive is absorbed by cellulose and, after the components have been mixed, redistributed in the thermoplastic composition.

The solid mixture thus obtained is further pre-mixed, so as to obtain an even distribution of the components.

The thermoplastic composition which is the object of the present invention is then submitted to thermoforming or heat forming, in order to obtain the thermoformed composite material which is the object of the present invention, both as semifinished product, such as pellets, granules, powders, threads/yarns, filaments for use in 3D printing, reinforcement profiles, films, monofilaments, pipes, plates, blown extruded pieces, and as finished article, such as receptacles, tubs for foodstuff, display units, packagings of any kind, objects of any kind.

In the case of production of filaments for 3D printing:
  the thermoplastic composition in the form of granule or powder is introduced into an extruder with an appropriate temperature (140-190° C.) and an appropriate screw rotational speed (approximately 150 rpm), obtaining outlet filaments with an adequate diameter (at best 1.75 mm, but also 3 mm or other diameters),
  at the outlet of the extruder nozzle the filaments are cooled and can be wound in coils.

The manufactured articles made of the thermoformed composite material which is the object of the present invention can be transformed by 3D printing or through the common thermoforming techniques such as extrusion, injection, drawing, compression and vacuum moulding or rotational moulding or blow moulding, with the ordinary equipment used in said technologies.

The semifinished products, such as pellets, granules, powders, threads/yarns, filaments for use in 3D printing, reinforcement profiles, containing the thermoformed composite material which is the object of the present invention, as well as the finished manufactured articles, where they can be obtained through direct thermoforming of the thermoplastic composition which is the object of the present invention, can be implemented by submitting the thermoplastic composition which is the object of the present invention to the common methods of thermoforming, such as: extrusion, injection, drawing, compression and vacuum moulding or rotational moulding or blow moulding, with the ordinary equipment used in said technologies, such as those used for the production of films, monofilaments, pipes, plates, blown extruded pieces of known plastic materials such as polyolefins, chlorovinyl, polystyrene and polyamide resins.

The advantages which can be achieved through the thermoformed composite material which is the object of the present invention are a better environmental sustainability:
  the used cellulose is obtained from recycled paper/cardboard
  the used cellulose avoids soil from being taken away from agriculture
  considering the presence of the main components of the thermoformed composite material: cellulose and material comprising hydrolysable or hydrosoluble polyhydroxylated polymers, the composite material which is the object of the present invention has a high degree of environmental sustainability because it is highly recyclable with paper/cardboard and it is biosustainable Functional Properties:
high elastic deformability
high ability to resume the shape
possibility to implement thin thicknesses
high speed of 3D printing
ease of thermoforming
it is weldable or repairable through brushing with water, also due to the presence of materials based on hydrolysable or hydrosoluble polyhydroxylated polymers, in particular polymers based on polyvinyl alcohol (PVA)

Sensory Properties:
colour and touch of Kraft paper
it can be coloured like paper (water colours should be avoided)

(Long-Standing) Waterproofing:
the manufactured articles obtained by submitting to thermoforming, such as extrusion, injection, drawing, compression and vacuum moulding or rotational moulding or blow moulding, 3D printing, the thermoformed composite material which is the object of the present invention can be waterproofed in order to achieve a long useful life of the same, by applying on the surface, through immersion or brushing, coatings based on non aqueous products, in particular non-hydrosoluble enamels based on nitrocellulose, acrylate/styrene copolymers or hydrosoluble enamel paint comprising acrylic resins; however, other products such as some hydrosoluble enamels can also be used.

In order to better understand the present invention and implement the same, some illustrative examples are provided hereinafter, which are not at any rate to be regarded as a limitation of the scope of the invention.

EXAMPLES

Unless otherwise specified, the percentages (%) provided are to be understood as w/w (weight/weight) %.

Example 1

Two solid thermoplastic compositions according to the present invention were prepared, comprising micrometric cellulose fibre, combined, from time to time, with two different amounts of a thermoplastic material comprising a polymer based on powder polyvinyl alcohol: for the first composition in a 1 to 1 ratio, so as to obtain a composition comprising the combination cellulose fibre-polymer based on polyvinyl alcohol containing 50% by weight of cellulose fibre; for the second composition in a 1 to 2.33 ratio, so as to obtain a composition comprising the combination cellulose fibre-polymer based on polyvinyl alcohol containing 30% by weight of fibre.

The compositions were submitted to normal blending so as to have an even dispersion of the relevant two components.

The solid mixtures thus obtained were extruded through a screw extruder in order to obtain filaments having a 1.75-mm diameter (operating conditions:

Temp.: 140-190° C., throughput 31 g/min, rotations per minute: 150).

It was hence proved that the thermoplastic composition according to the present invention can be easily submitted to ordinary methods of heat forming, in particular it can be extruded in filaments having the most widely used size in 3D printing, in order to obtain a thermoformed composite material according to the present invention.

Further filaments for 3D printing were extruded, by submitting known materials such as ABS and PLA to extrusion. Filaments of the 4 mentioned materials were then used in a 3D printer to implement dogbone specimens; no difficulties whatsoever were remarked in 3D printing of the specimens of the composite materials consisting of 30% and 50% of cellulose fibre. In this way it was proved that the filaments of the composite material which is the object of the invention can actually be used in 3D printing.

Mechanical tests were then performed.

For the tests, dogbone specimens were used, obtained through 3D printing from the extruded filaments of the 4 materials, having an overall length of 53 mm and a width of 10 mm, with a gauge length of 32 mm and a section of 5×2 mm. For each material and type of samples, 4 specimens were tested.

All the tests were performed using the instrument MTS, model 1/MH with a 5 kN load cell, the instrument is software-driven (Testworks), the tests were accomplished by positioning the specimen in the pneumatic grips, exerting a pressure on the grips amounting to 2 bar, the tests were performed using a 0.01 N preload and a constant shifting rate of the moveable crossbar of 50 mm/min. The results are shown in Table 1.

TABLE 1

| | Dogbone specimens obtained by 3D printing | | |
|---|---|---|---|
| | Young's modulus E (MPa) | Yield strength $\sigma_r$ (MPa) | Deformation or ultimate elongation $\varepsilon_r$ (%) |
| ABS | 868 ± 204 | 32.8 ± 3.3 | 5.0 ± 0.2 |
| PLA | 1,413 ± 151 | 42.8 ± 4.3 | 4.5 ± 0.4 |
| 30% Composite | 40 ± 2 | 6.8 ± 0.1 | 53.6 ± 4.8 |
| 50% Composite | 98 ± 8 | 7.2 ± 0.6 | 17.2 ± 0.7 |

The tests showed first of all an excellent reproducibility of the results of the tests accomplished on composite materials, bearing out their quality in 3D printing.

The composite materials which are the object of the present patent have also shown a low Young's modulus and a high elastic recovery, a property which is significantly different from those of the materials traditionally useable in 3D printing, potentially very advantageous for a large number of possible applications. In particular, the composite with 50% of cellulose fibres is to be regarded as more suitable for general uses, on account of the high percentage of recyclable material, whereas the composite with 30% of cellulose fibres is more suitable when particular deformability and elastic recovery properties are needed.

Example 2

Exploiting the availability, inside the thermoformed composite material, of a thermoplastic material comprising a hydrolysable or hydrosoluble polyhydroxylated polymer, in particular a hydrosoluble polymer such as polyvinyl alcohol, the possibility to weld the material by simply wetting with a thin layer of water the surfaces of the material to be joint was assessed. The assumed property was actually ascertained with both empirical tests and tensile tests on specimens such as those used in example 1 (specimens of thermoformed composite material containing 50% of cellulose fibre: 50% composite) after cutting them with a cutter inside the gauge length, after wetting with water the two cutting surfaces and pressing them against each other for about 1 minute.

The results of the tests performed on the two specimens are shown in Table 2.

As can be seen, the mechanical strength values, particularly those of tensile strength, remained almost the same as those obtained on the intact sample, falling inside experimental dispersion.

TABLE 2

| | Dogbone specimens obtained by 3D printing | | |
|---|---|---|---|
| | Young's modulus E (MPa) | Yield strength $\sigma_r$ (MPa) | Deformation or ultimate elongation $\varepsilon_r$ (%) |
| 50% composite, single piece | 98 ± 8 | 7.2 ± 0.6 | 17.2 ± 0.7 |
| 50% composite, cut and welded with water | 113 ± 21 | 7.7 ± 0.2 | 13.2 ± 2.4 |

The results show a surprising peculiarity of the material which is the object of the present patent, which can be used in several ways. For example, a 3D printing of a ring was made with the material which is the object of the present invention, after splitting the 3D files in two halves, implementing the two parts separately and welding them after simply wetting the two surfaces with water. The ring obtained in this way turned out to be aesthetically and mechanically indistinguishable from a ring made with a single 3D file, however the 3D printing step turned out to be considerably simpler.

Example 3

Thermoplastic compositions with 50% of cellulose fibre, but from time to time containing different percentages of the other components, were extruded as described in example 1, obtaining filaments of thermoformed composite material, all containing 50% of cellulose fibre, but from time to time containing different percentages of the other components. Said materials were used in 3D printing implementing 30×30×2-mm samples, all based on composite material with 50% of cellulose fibre, but from time to time containing different percentages of the other components. The specimens derived from said samples were submitted to water dissolution tests as follows:

5 different specimens were tested:
specimen with 50% of the thermoplastic material comprising a polymer based on polyvinyl alcohol,
specimen with 46.7% of the thermoplastic material comprising a polymer based on polyvinyl alcohol and 3.3% of ketone-aldehyde resin,
specimen with 40% of the thermoplastic material comprising a polymer based on polyvinyl alcohol and 10% of ketone-aldehyde resin,
specimen with 50% of the thermoplastic material comprising a polymer based on polyvinyl alcohol coated with non-hydrosoluble enamel,
specimen with 50% of the thermoplastic material comprising a polymer based on polyvinyl alcohol coated with hydrosoluble enamel.

Figure 2:
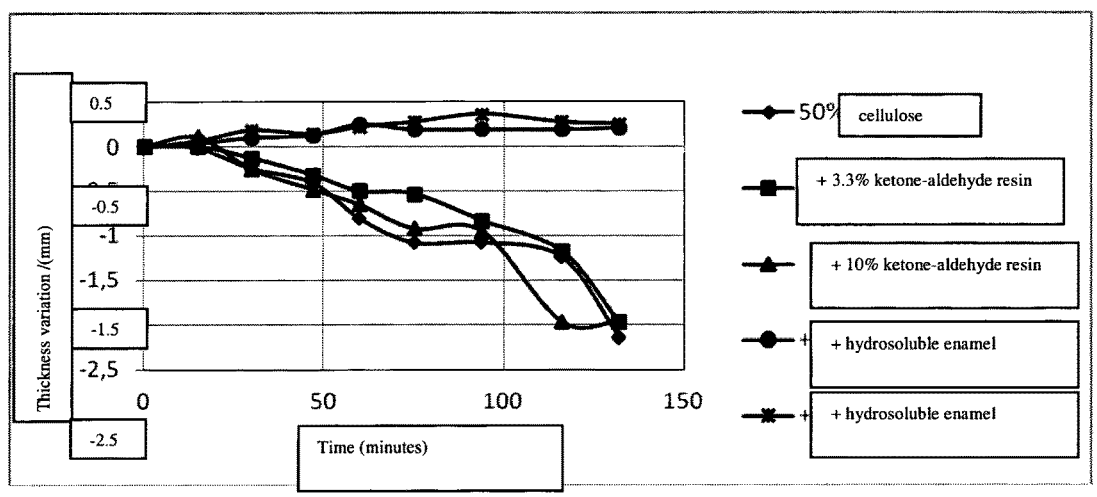
FIG. 2. The graph representing the progress of dissolution in water is again shown: thickness variation as a function of the immersion time, at a temperature of 45° C., of specimens implemented with the thermoformed composite material according to the present invention.
Figure 3:
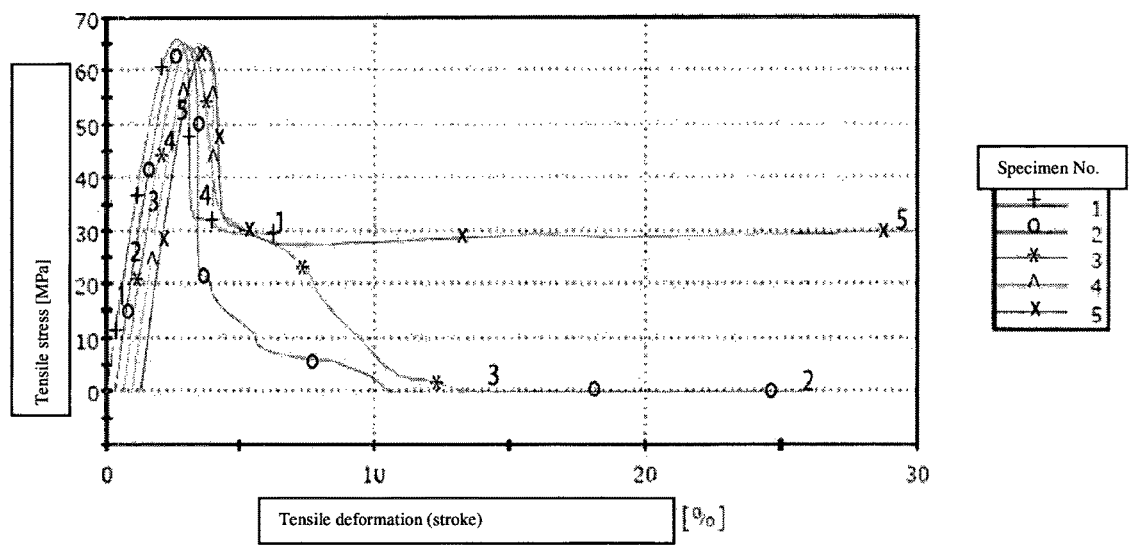
FIG. 3. Graphic representation of the tensile stress vs. tensile deformation for specimens made only of polymer based on polyvinyl alcohol (Hydrolene®).
Figure 4:
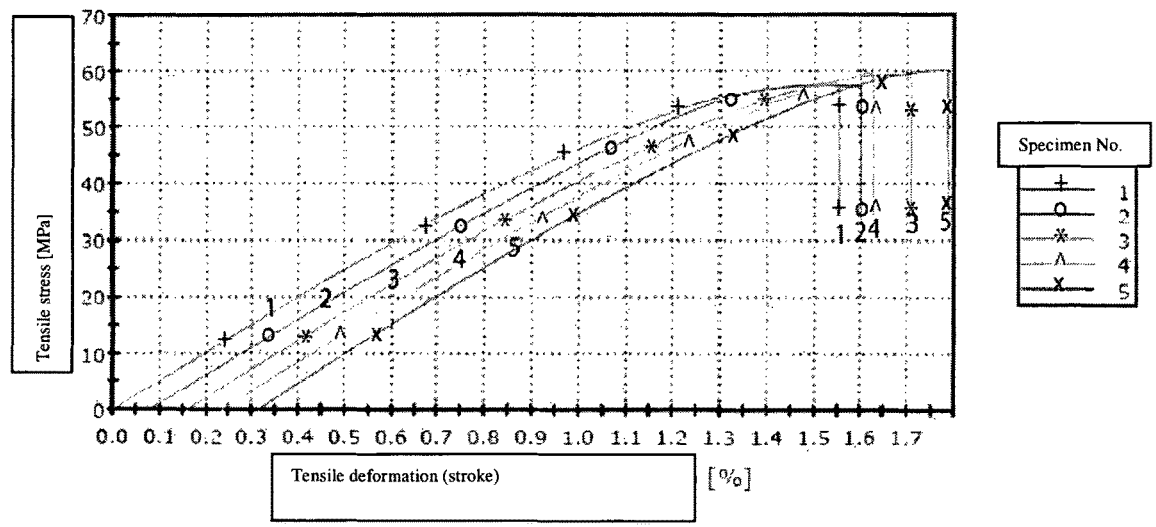
FIG. 4. Graphic representation of the tensile stress vs. tensile deformation for specimens made of composite material consisting of 30% by weight of cellulose fibres in combination with a polymer based on polyvinyl alcohol (Hydrolene®).
Figure 5:
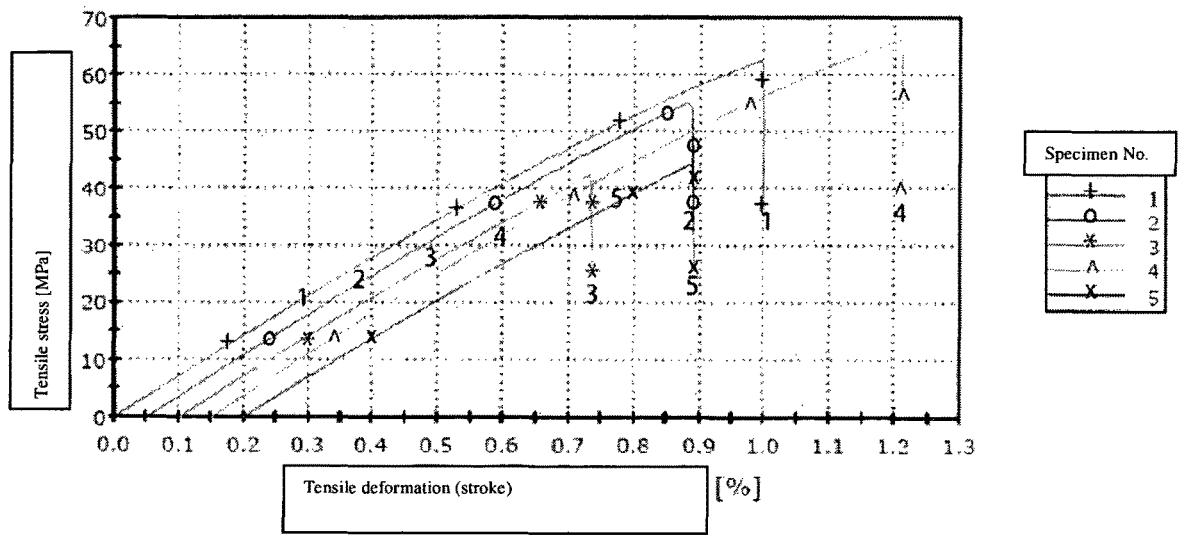
FIG. 5. Graphic representation of the tensile stress vs. tensile deformation for specimens made of composite material consisting of 50% by weight of cellulose fibres in combination with a polymer based on polyvinyl alcohol (Hydrolene®).

The specimens were immersed in a mildly stirred water solution at room/ambient temperature (20 25° C.) and at 45° C. and the thickness variation was assessed at intervals of 15-20 minutes. The results are shown in FIGS. 1 and 2.

The tests showed that the samples not coated with non-hydrosoluble enamel or with hydrosoluble enamel dissolved in water in less than an hour, confirming that the material can be recycled with paper and cardboard, since immersion in water also at room/ambient temperature is able to determine the dissolution of the thermoplastic material comprising a polymer based on polyvinyl alcohol, well described in literature (DeMerlis C C, Schoneker D R. Food Chem Toxicol 41 (2003) 319-26 or Zhang S J, Yu H Q. Water Res 38 (2004) 309-16), which does not involve the release of toxic substances and the release of cellulose fibres.

The addition of ketone-aldehyde resin at a rate of 3.3% only slightly decreases the dissolution speed, whereas the addition of 10% ketone-aldehyde resin significantly increases the solubilisation speed.

Conversely, the specimens coated with non-hydrosoluble enamel and with hydrosoluble enamel did not dissolve at all in water, either at room/ambient temperature or at 50° C., confirming the possibility to stabilise the material against water degradation, which is certainly a very important factor, particularly in 3D printing, where the finished manufactured article is to made durable.

Example 4

In order to ascertain the printability of the thermoformed composite material, particularly in 3D printing when excessive moisture has been previously absorbed, a series of functional tests of 3D printing were made, using filaments based on the thermoformed composite material. The filaments obtained by extruding thermoplastic compositions with 50% of cellulose fibre, then filaments of the thermoformed composite material which is the object of the present invention, all containing 50% of cellulose fibre, but from time to time containing different percentages of the other components, were handled as follows:
filaments with 50% of the thermoplastic material comprising a polymer based on polyvinyl alcohol left in the open air for at least 7 days,
filaments with 46.7% of the thermoplastic material comprising a polymer based on polyvinyl alcohol and 3.3% of ketone-aldehyde resin left in the open air for at least 7 days,
filaments with 40% of the thermoplastic material comprising a polymer based on polyvinyl alcohol and 10% of ketone-aldehyde resin, left in the open air for at least 7 days,
filaments with 50% of the thermoplastic material comprising a polymer based on polyvinyl alcohol, dry-heated in the oven at 80° C. for 30 minutes,
filaments with 46.7% of the thermoplastic material comprising a polymer based on polyvinyl alcohol and 3.3% of ketone-aldehyde resin, dry-heated in the oven at 80° C. for 30 minutes,
filaments with 40% of the thermoplastic material comprising a polymer based on polyvinyl alcohol and 10% of ketone-aldehyde resin, dry-heated in the oven at 80° C. for 30 minutes,
filaments with 50% of the thermoplastic material comprising a polymer based on polyvinyl alcohol moist-heated in the oven at 80° C. for 30 minutes,
filaments with 46.7% of the thermoplastic material comprising a polymer based on polyvinyl alcohol and 3.3% of ketone-aldehyde resin, moist-heated in the oven at 80° C. for 30 minutes, filaments with 40% of the thermoplastic material comprising a polymer based on polyvinyl alcohol and 10% of ketone-aldehyde resin, moist-heated in the oven at 80° C. for 30 minutes.

The filaments described above were all used in 3D printing.

The functional tests allowed the following conclusions to be drawn:

the filaments left in the open air for at least 7 days proved to be hard to be printed only in the case of filaments with 40% of the thermoplastic material comprising a polymer based on polyvinyl alcohol and 10% of ketone-aldehyde resin, the filaments which were dry-heated in the oven did not prove hard to be printed, the filaments which were most-heated in the oven proved hard to be printed, particularly in the case of filaments with 40% of the thermoplastic material comprising a polymer based on polyvinyl alcohol and 10% of ketone-aldehyde resin.

The tests allowed the following overall conclusions to be drawn:

an addition of 3.3% of ketone-aldehyde resin does not significantly improve 3D printability, whereas an addition of 10% of ketone-aldehyde resin has an adverse effect, the filaments hardly absorb moisture from the air even after several days of exposition, dry-heating in the oven, for example at 80° C. for 30 minutes, can at any rate make the manufactured filaments easily printable with 3D printing.

Example 5

In order to assess whether the thermoformed composite material according to the present invention can be easily smoothed after 3D printing, in order to improve the surface aspect thereof, some pieces having a complex shape, implemented by 3D printing using the thermoformed composite material which is the object of the present invention, were submitted to the following three treatments:

immersion for about 30 seconds in water, immersion for about 30 seconds in denatured ethyl alcohol, immersion for about 30 seconds in a mixture of water+ethyl alcohol, smoothing was then attempted by running a wad of cotton-wool.

The tests proved that:

after immersion in water, the material starts to undergo a degradation which impairs its surface quality during smoothing, after immersion in denatured ethyl alcohol, the smoothing operation does not allow the surface quality of the material to be altered, after immersion in a mixture of water+ethyl alcohol, the smoothing operation significantly improves surface quality.

Example 6

The examples above show an optimal process for producing pieces with the 3D printing technology, implemented with the material which is the object of the present invention, which are somehow significantly more innovative and performing than similar components made with traditional materials.

In particular, the following manufacturing process can be followed:

3D printing, also making virtual sectioning in the production files if this should be of use for 3D printing, welding the pieces obtained in this way, by pressing them after wetting their surfaces with water, smoothing through immersion in a mixture of water+ethyl alcohol and rubbing with any pad (wad of cotton-wool, cloth, etc.), finishing the piece by coating with non-hydrosoluble enamel to ensure, where needed, resistance to accidental wetting with water.

Example 7

Two solid thermoplastic compositions according to the present invention were prepared, comprising micrometric cellulose fibre, combined, from time to time, with two different amounts of a thermoplastic material comprising a polymer based on powder polyvinyl alcohol (HYDROLENE®): for the first composition in a 1 to 1 ratio, so as to obtain a composition comprising the combination cellulose fibre-polymer based on polyvinyl alcohol containing 50% by weight of cellulose fibre; for the second composition in a 1 to 2.33 ratio, so as to obtain a composition comprising the combination cellulose fibre-polymer based on polyvinyl alcohol containing 30% by weight of fibre.

The compositions were submitted to normal blending so as to have an even dispersion of the relevant two components.

The solid mixtures thus obtained were extruded through a screw extruder in order to obtain filaments having a 1.75-mm diameter (operating conditions:

Temp.: 140-190° C., throughput 31 g/min, rotations per minute: 150).

It was hence proved that the thermoplastic composition according to the present invention can be easily submitted to ordinary methods of heat forming, in order to obtain a thermoformed composite material according to the present invention.

Further filaments were extruded, by submitting the thermoplastic material comprising a polymer based on powder polyvinyl alcohol (HYDROLENE®) to extrusion.

Filaments of the 3 mentioned materials: only the polymer matrix based on polyvinyl alcohol (HYDROLENE®), the composite material containing HYDROLENE® and the 30% of cellulose fibres, the composite material containing HYDROLENE® and the 50% of cellulose fibres, were then first of all submitted to pelletization by cutting the filaments in small pieces having a length of a few mm and were then submitted to injection moulding to implement 5 dogbone specimens for each of the three types of extruded materials; no difficulties whatsoever were remarked in injection moulding of the specimens of the composite materials consisting of 30% and 50% of cellulose fibre. In this way it was proved that the filaments of the composite material which is the object of the invention can actually be used in injection moulding after pelletization.

Mechanical tests were then performed.

The dogbone specimens obtained through injection moulding, having an overall length of 53 mm and a width of 10 mm, with a gauge length of 32 mm and a section of 5×2 mm, were used. For each material and type of samples, 5 specimens were tested.

All the tests were performed using the instrument MTS, model 1/MH with a 5 kN load cell, the instrument is software-driven (Testworks), the tests were accomplished by positioning the specimen in the pneumatic grips, exerting a pressure on the grips amounting to 2 bar, the tests were performed using a 0.01 N preload and a constant shifting rate of the moveable crossbar of 50 mm/min. The results of the average values of mechanical properties, such as: Young's modulus, yield strength and deformation or ultimate elongation, relating to the 5 specimens implemented with each of the three types of tested materials, are shown in Table 3.

TABLE 3

Dogbone specimens obtained by injection moulding

| | Young's modulus E (GPa) | Yield strength $\sigma_r$ (MPa) | Deformation or ultimate elongation $\varepsilon_r$ (%) |
|---|---|---|---|
| HYDROLENE ® | 3.57 ± 0.13 | 65.0 ± 0.6 | 15.45 ± 11.29 |
| Composite HYDROLENE ® + 30% cellulose fibres | 5.19 ± 0.10 | 58.1 ± 1.1 | 1.49 ± 0.07 |
| Composite HYDROLENE ® + 50% cellulose fibres | 7.17 ± 0.14 | 51.1 ± 9.5 | 0.84 ± 0.19 |

The tests showed first of all an excellent reproducibility of the results of the tests accomplished on composite materials, bearing out their quality in extrusion and injection moulding.

Various Tables below (Table 3a, Table 3b and Table 3c) show the values of the following mechanical properties: Young's Modulus, Yield Strength, Yield Strain, Ultimate Tensile Strength and Fracture strain for each of the 5 specimens (referred to by numbers 1 to 5), implemented with each of the three tested materials: only the polymer matrix based on polyvinyl alcohol (HYDROLENE®), the composite material containing HYDROLENE® and the 30% of cellulose fibres, the composite material containing HYDROLENE® and the 50% of cellulose fibres.

Table 3a of the values of the following mechanical properties: Young's Modulus, Yield Strength, Yield Strain, Ultimate Tensile Strength and Fracture strain or each of the 5 specimens (referred to by numbers 1 to 5), implemented by injection moulding of the polymer based on polyvinyl alcohol (HYDROLENE®):

| Hydrolene ® | Young's Modulus (GPa) | Yield Strength (MPa) | Yield Strain (%) | Ultimate Tensile Strength (MPa) | Fracture strain (%) |
|---|---|---|---|---|---|
| Test 1 | 3.38 | 65.9 | 2.7 | 29.7 | 6.4 |
| Test 2 | 3.50 | 65.2 | 2.5 | 0.03 | 25.5 |
| Test 3 | 3.65 | 64.5 | 2.4 | 0.04 | 13.8 |
| Test 4 | 3.60 | 64.9 | 2.5 | 58.2 | 3.0 |
| Test 5 | 3.72 | 64.5 | 2.4 | 30.0 | 28.5 |
| Average | 3.57 | 65.0 | 2.5 | 23.6 | 15.4 |
| Standard dev. | 0.13 | 0.57 | 0.10 | 24.42 | 11.29 |

Table 3b of the values of the following mechanical properties: Young's Modulus, Yield Strength, Yield Strain, Ultimate Tensile Strength and Fracture strain or each of the 5 specimens (referred to by numbers 1 to 5), implemented by injection moulding of the composite material containing HYDROLENE® and 30% of cellulose fibres:

| Hydrolene © + 30% cellulose fibre | Young's Modulus (GPa) | Yield Strength (MPa) | Yield Strain (%) | Ultimate Tensile Strength (MPa) | Fracture strain (%) |
|---|---|---|---|---|---|
| Test 1 | 5.16 | 57.5 | 1.5 | 57.4 | 1.5 |
| Test 2 | 5.09 | 57.4 | 1.4 | 57.1 | 1.5 |
| Test 3 | 5.14 | 59.4 | 1.5 | 59.3 | 1.6 |
| Test 4 | 5.20 | — | — | 59.7 | 1.4 |
| Test 5 | 3.34 | — | — | 60.2 | 1.5 |
| Average | 5.19 | 58.1 | 1.5 | 58.8 | 1.6 |
| Standard dev. | 0.10 | 1.08 | 0.04 | 1.40 | 0.07 |

Table 3c of the values of the following mechanical properties: Young's Modulus, Yield Strength, Yield Strain, Ultimate Tensile Strength and Fracture strain or each of the 5 specimens (referred to by numbers 1 to 5), implemented by injection moulding of the composite material containing HYDROLENE® and 50% of cellulose fibres:

| Hydrolene © + 50% cellulose fibre | Young's Modulus (GPa) | Yield Strength (MPa) | Yield Strain (%) | Ultimate Tensile Strength (MPa) | Fracture strain (%) |
|---|---|---|---|---|---|
| Test 1 | 7.18 | 62.5 | 1.0 | 62.5 | 1.0 |
| Test 2 | 7.26 | 55.2 | 0.8 | 54.1 | 1.2 |
| Test 3 | 7.16 | 44.3 | 0.6 | 42.3 | 0.7 |
| Test 4 | 7.32 | — | — | 66.0 | 1.9 |
| Test 5 | 6.94 | 44.5 | 0.7 | 44.5 | 0.7 |
| Average | 7.17 | 51.1 | 0.8 | 53.9 | 1.2 |
| Standard dev. | 0.14 | 9.46 | 0.16 | 10.55 | 0.53 |

The composite materials which are the object of the present patent also showed, when thermo-extruded, also through injection moulding, a high Young's modulus, always higher than the value referable only to the polymer based on polyvinyl alcohol (almost twice as much in the case of the 50% composite material), with a decrease of the yield strength of only about 20%.

Particularly, it is highlighted that the stiffness of the composite material containing 50% of cellulose fibre (Young's Modulus >7 GPa) is approximately ⅔ times more than the one of the most common polymer materials, so that possible major applications of a material with such high stiffness can be intuitively inferred.

The invention claimed is:
1. A thermoplastic composition, suitable to be submitted to common methods of heat forming, or thermoforming, of thermoplastic materials, consisting of a substantially anhydrous mixture consisting of:
   cellulose particles, in combination with
   particles of a thermoplastic material consisting of a hydrolysable or hydrosoluble polyhydroxylated polymer,
   wherein cellulose is provided in an amount ranging from 30 to 60% by weight, said percentage being calculated on 100 parts by weight of the combination of cellulose with the thermoplastic material consisting of a hydrolysable or hydrosoluble polyhydroxylated polymer.
2. A thermoplastic composition according to claim 1, wherein the thermoplastic material consisting of a hydrolysable or hydrosoluble polyhydroxylated polymer is selected from: a thermoplastic material consisting of starch, a thermoplastic material consisting of polyvinyl alcohol.
3. A thermoplastic composition, suitable to be submitted to common methods of heat forming, or thermoforming, of thermoplastic materials, consisting of:

cellulose particles, in combination with particles of a thermoplastic material consisting of a hydrolysable or hydrosoluble polyhydroxylated polymer, wherein cellulose is provided in an amount ranging from 30 to 60% by weight, said percentage being calculated on 100 parts by weight of the combination of cellulose with the thermoplastic material consisting of a hydrolysable or hydrosoluble polyhydroxylated polymer, and an additive consisting of ketone-aldehyde resins, in order to modulate the water degradability and moisture sensitivity of the thermoplastic composition, wherein the additive is provided in an amount equal to or less than 10% by weight, cellulose is provided in an amount ranging from 30 to 60% by weight, said percentages being calculated on 100 parts by weight of the sum of the three components: cellulose, thermoplastic material and additive.

4. A thermoplastic composition according to claim 3, wherein the thermoplastic material consisting of a hydrolysable or hydrosoluble polyhydroxylated polymer is selected from: a thermoplastic material consisting of starch, a thermoplastic material consisting of polyvinyl alcohol.

5. A thermoplastic composition according to claim 1 in the form of dry-blend.

6. A thermoformed composite material consisting of:
cellulose, in combination with
a thermoplastic material consisting of a hydrolysable or hydrosoluble polyhydroxylated polymer,
wherein cellulose is provided in an amount ranging from 30 to 60% by weight, said percentage being calculated on 100 parts by weight of the combination of cellulose with the thermoplastic material consisting of a hydrolysable or hydrosoluble polyhydroxylated polymer.

7. A thermoformed composite material according to claim 6, wherein the thermoplastic material consisting of a hydrolysable or hydrosoluble polyhydroxylated polymer is selected from: a thermoplastic material consisting of starch, a thermoplastic material consisting of polyvinyl alcohol.

8. A manufactured article, selected from the group consisting of receptacles, tubs for foodstuff, display units, packagings, or objects, with each article achieved by extrusion, injection, drawing, moulding and 3D printing consisting of the thermoformed composite material according to claim 6.

9. A semi-finished product, selected from the group consisting of pellets, granules, powders, threads/yarns, filaments for use in 3D printing, reinforcement profiles, films, monofilaments, pipes, plates, and blown extruded pieces consisting of the thermoformed composite material according to claim 6.

10. A thermoformed composite material consisting of:
cellulose, in combination with
a thermoplastic material consisting of a hydrolysable or hydrosoluble polyhydroxylated polymer,
wherein cellulose is provided in an amount ranging from 30 to 60% by weight, said percentage being calculated on 100 parts by weight of the combination of cellulose with the thermoplastic material consisting of a hydrolysable or hydrosoluble polyhydroxylated polymer; and
an additive consisting of ketone-aldehyde resins, to modulate the water degradability and moisture sensitivity of the thermoformed composite material, wherein the additive is provided in an amount equal to or less than 10% by weight, cellulose is provided in an amount ranging from 30 to 60% by weight, said percentages being calculated on 100 parts by weight of the sum of the three components: cellulose, thermoplastic material and additive.

11. A thermoplastic composition according to claim 1, wherein cellulose is provided in an amount from 40 to 60% by weight.

12. A thermoplastic composition according to claim 3, wherein cellulose is provided in an amount from 40 to 60% by weight, said percentages being calculated on 100 parts by weight of the sum of the three components: cellulose, thermoplastic material and additive.

13. A thermoformed composite material according to claim 6, wherein cellulose is provided in an amount from 40 to 60% by weight.

14. A thermoformed composite material according to claim 10, wherein cellulose is provided in an amount from 40 to 60% by weight, said percentages being calculated on 100 parts by weight of the sum of the three components: cellulose, thermoplastic material and additive.

15. A thermoformed composite material according to claim 10, wherein the thermoplastic material consisting of a hydrolysable or hydrosoluble polyhydroxylated polymer is selected from: a thermoplastic material consisting of starch, a thermoplastic material consisting of polyvinyl alcohol.

* * * * *